United States Patent
Chen et al.

(10) Patent No.: US 9,553,898 B2
(45) Date of Patent: *Jan. 24, 2017

(54) GATEWAY BASED AND CENTRIC NETWORK MANAGEMENT AND COORDINATION

(71) Applicant: BROADCOM CORPORATION, Irvine, CA (US)

(72) Inventors: Xuemin (Sherman) Chen, Rancho Santa Fe, CA (US); Avi Kliger, Ramat Gan (IL); Philippe Klein, Jerusalem (IL)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,803

(22) Filed: May 24, 2015

(65) Prior Publication Data

US 2015/0256560 A1 Sep. 10, 2015

Related U.S. Application Data

(63) Continuation of application No. 13/726,983, filed on Dec. 26, 2012, now Pat. No. 9,042,368.

(60) Provisional application No. 61/734,534, filed on Dec. 7, 2012.

(51) Int. Cl.
*H04L 1/00* (2006.01)
*H04L 29/06* (2006.01)
*H04N 21/4363* (2011.01)
*H04L 12/66* (2006.01)

(52) U.S. Cl.
CPC ............. *H04L 65/103* (2013.01); *H04L 12/66* (2013.01); *H04L 65/1026* (2013.01); *H04L 65/4084* (2013.01); *H04L 65/605* (2013.01); *H04N 21/4363* (2013.01)

(58) Field of Classification Search
CPC .......... H04L 47/10; H04L 47/30; H04L 47/11; H04L 47/12; H04L 47/15; H04L 47/70; H04L 47/2441; H04L 65/00; H04L 45/00; H04L 45/02; H04L 45/04
USPC ........ 370/229–235, 334, 351–356, 400–402, 370/463, 339, 252
See application file for complete search history.

(56) References Cited

U.S. PATENT DOCUMENTS

2012/0042091 A1* 2/2012 McCarthy .......... H04N 7/17318
709/231

* cited by examiner

*Primary Examiner* — Dady Chery
(74) *Attorney, Agent, or Firm* — Garlick & Markison; Shayne X. Short

(57) ABSTRACT

Gateway based and centric network management and coordination. Coordination and management of delivery of a source sequence, that has possibly undergone adaptive bit rate (ABR) encoding upstream to generate a number of respective fragments that may have different respective bit rates associated therewith, to one or more downstream, user, or client devices is achieved via appropriate communication network management and coordination performed by one or more communication devices within the system. In one instance, a home gateway communication device operates to perform such coordination management of a convergent network or convergent digital home network (CDHN). Consideration of any one or more local and/or remote conditions, parameters, etc. may be employed by such an application to ensure effective delivery of a source sequence to one or more client devices.

20 Claims, 9 Drawing Sheets

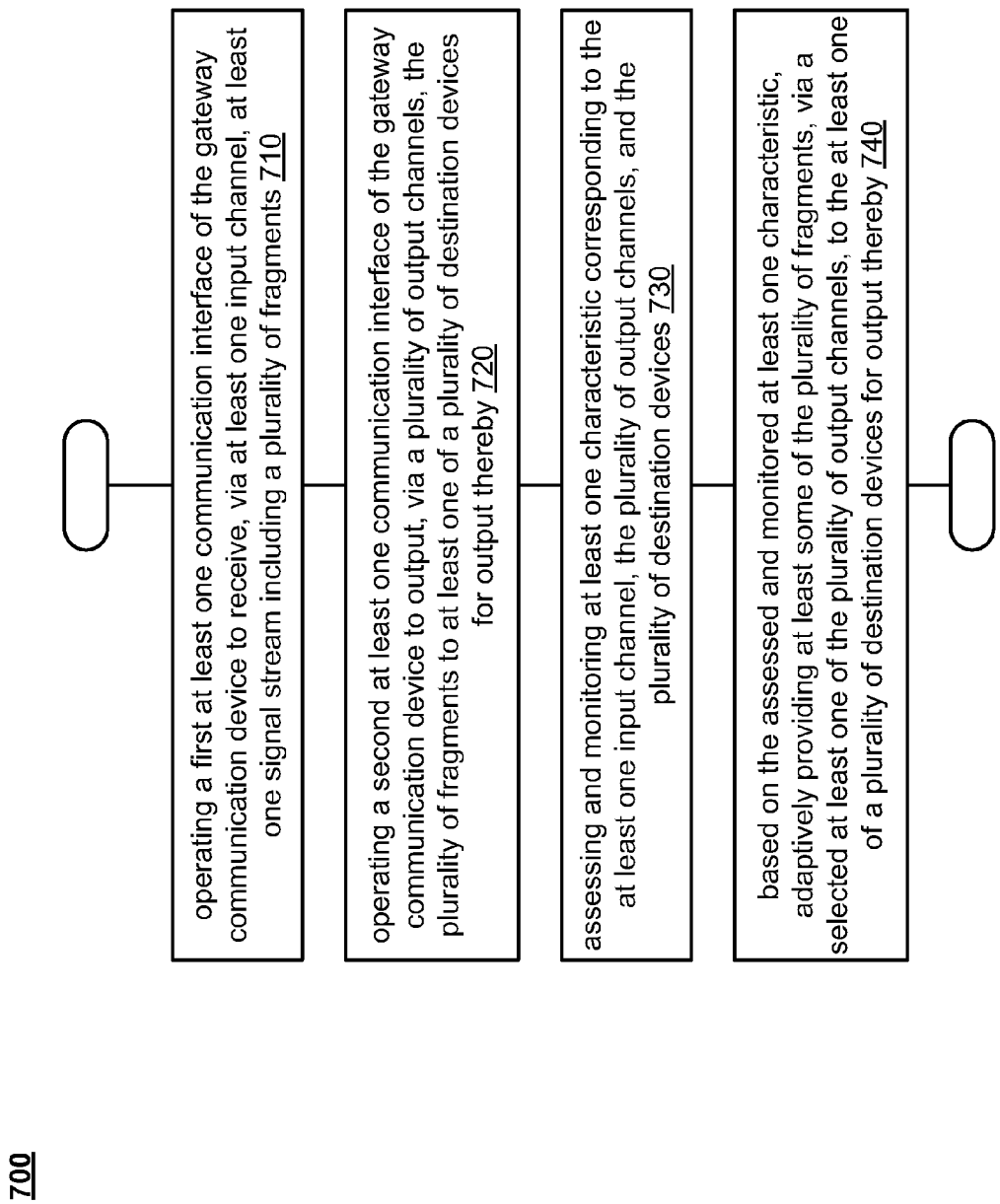

GATEWAY BASED AND CENTRIC NETWORK MANAGEMENT AND COORDINATION

CROSS REFERENCE TO RELATED PATENTS/PATENT APPLICATIONS

The present U.S. Utility patent application claims priority pursuant to 35 U.S.C. §120 as a continuation of U.S. Utility application Ser. No. 13/726,983, entitled "Gateway based and centric network management and coordination," filed Dec. 26, 2012, pending, and scheduled subsequently to be issued as U.S. Pat. No. 9,042,368 on May 26, 2015 (as indicated in an ISSUE NOTIFICATION mailed from the USPTO on May 6, 2015), which claims priority pursuant to 35 U.S.C. §119(e) to U.S. Provisional Application No. 61/734,534, entitled "Gateway based and centric network management and coordination," filed Dec. 7, 2012, both of which are hereby incorporated herein by reference in their entirety and made part of the present U.S. Utility patent application for all purposes.

INCORPORATION BY REFERENCE

The following IEEE standards/IEEE draft standards are hereby incorporated herein by reference in their entirety and are made part of the present U.S. Utility patent application for all purposes:
1. IEEE Std 802.1AB™—2009 (Revision of IEEE Std 802.1AB™—2005), IEEE Standard for Local and Metropolitan Area Networks—Station and Media Access Control Connectivity Discovery, IEEE Computer Society, Sponsored by the LAN/MAN Standards Committee, 17 Sep. 2009, 204 pages.
2. IEEE P802.1Q-REV/D1.5, March 2011, IEEE Approved Draft Standard for Local and Metropolitan Area Networks—Media Access Control (MAC) Bridges and Virtual Bridged Local Area Networks, 29 Aug. 2011, 1376 pages.
3. IEEE P1905.1™/D09.00, 13 Dec. 2012, 1905_1-12-0138-03-WGDC-draft-for-D09, IEEE P1905.1™/D09.00 Draft Standard for Convergent Digital Home Network for Heterogeneous Technologies, Sponsor: Standards Committee of the IEEE Communications Society, IEEE-SA Standards Board, Prepared by the P1905.1 Working Group of the IEEE Communications Society, 94 total pages.

BACKGROUND OF THE INVENTION

Technical Field of the Invention

The invention relates generally to communication systems; and, more particularly, it relates to communication system network management and coordination.

Description of Related Art

Data communication systems have been under continual development for many years. One particular type of communication system is particularly related to heterogeneous networking technologies which may be implemented in accordance with home networking technologies. For example, within certain such network environments, as few as one or two or more different types of different respective network technologies may be implemented in accordance with a common abstract layer for supporting communications among such different network technologies.

As an example, different types of networks that may be implemented within such a heterogeneous networking technology environment may be varied. In addition, while it is noted that such different types of networks may be implemented within such a heterogeneous networking technology environment, the present art does not provide a means by which different respective networks may operate effectively and seamlessly with respect to another. For example, within any one respective network, there may be multiple respective communication links therein. Moreover, different respective networks may interface with respect to one another at more than one node or point.

The prior art fails to provide for effective operation of such heterogeneous networking technologies in regards to a number of issues including considerations such as network management, neighbor discovery, topology discovery, path selection, network control and management. While research and development continues in attempts to address these and other deficiencies within such convergent networks employing heterogeneous technologies, the prior art does not adequately provide acceptable solutions to allow for high levels of performance and broad implementation of such convergent networks.

BRIEF DESCRIPTION OF THE SEVERAL VIEWS OF THE DRAWINGS

FIG. 7, FIG. 8A, and FIG. 8B illustrate various embodiments of methods for operating one or more communication devices.

DETAILED DESCRIPTION OF THE INVENTION

Figure 1:
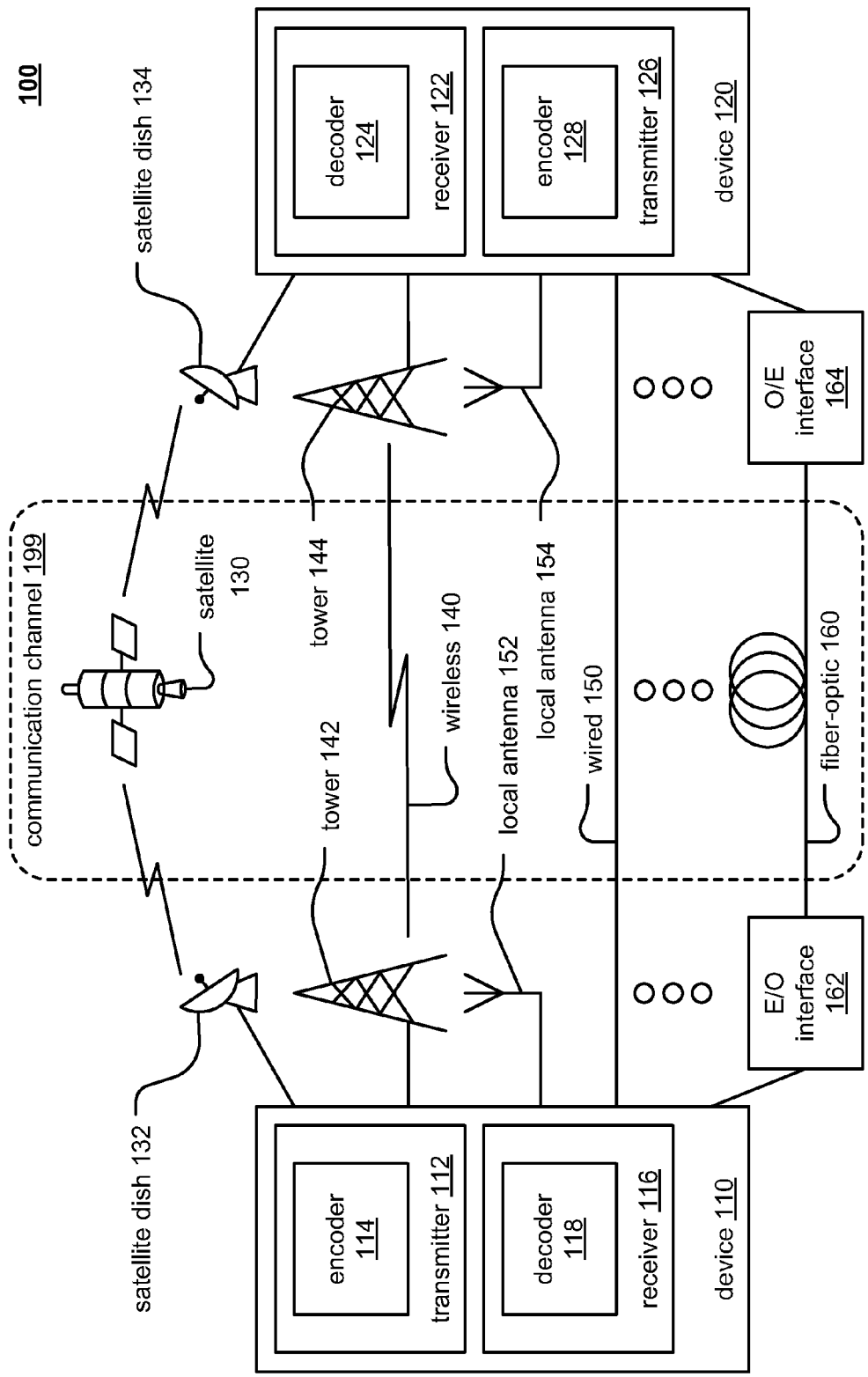
FIG. 1, FIG. 2, FIG. 3, and FIG. 4 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media (e.g., such as a storage device including at least one communication channel therein coupled to storage media), wired, wireless, fiber, copper, and other types of media as well.

FIG. 1, FIG. 2, FIG. 3, and FIG. 4 illustrate various embodiments of communication systems, 100, 200, 300, and 400, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which data (e.g., generally referred to as 'data' such as information, media [e.g., photos, video and/or audio, etc.], files, and/or generally, any desired information that may be transferred via a (digital) communication system) is communicated from one location, or subsystem, to another, data encoding may generally be viewed as being performed at a transmitting end of the communication channel 199, and data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only data encoding capability, and the communication device 120 may include only data decoding capability, or vice versa (e.g., in a uni-directional communication embodiment such as in accordance with a broadcast embodiment).

Figure 2:
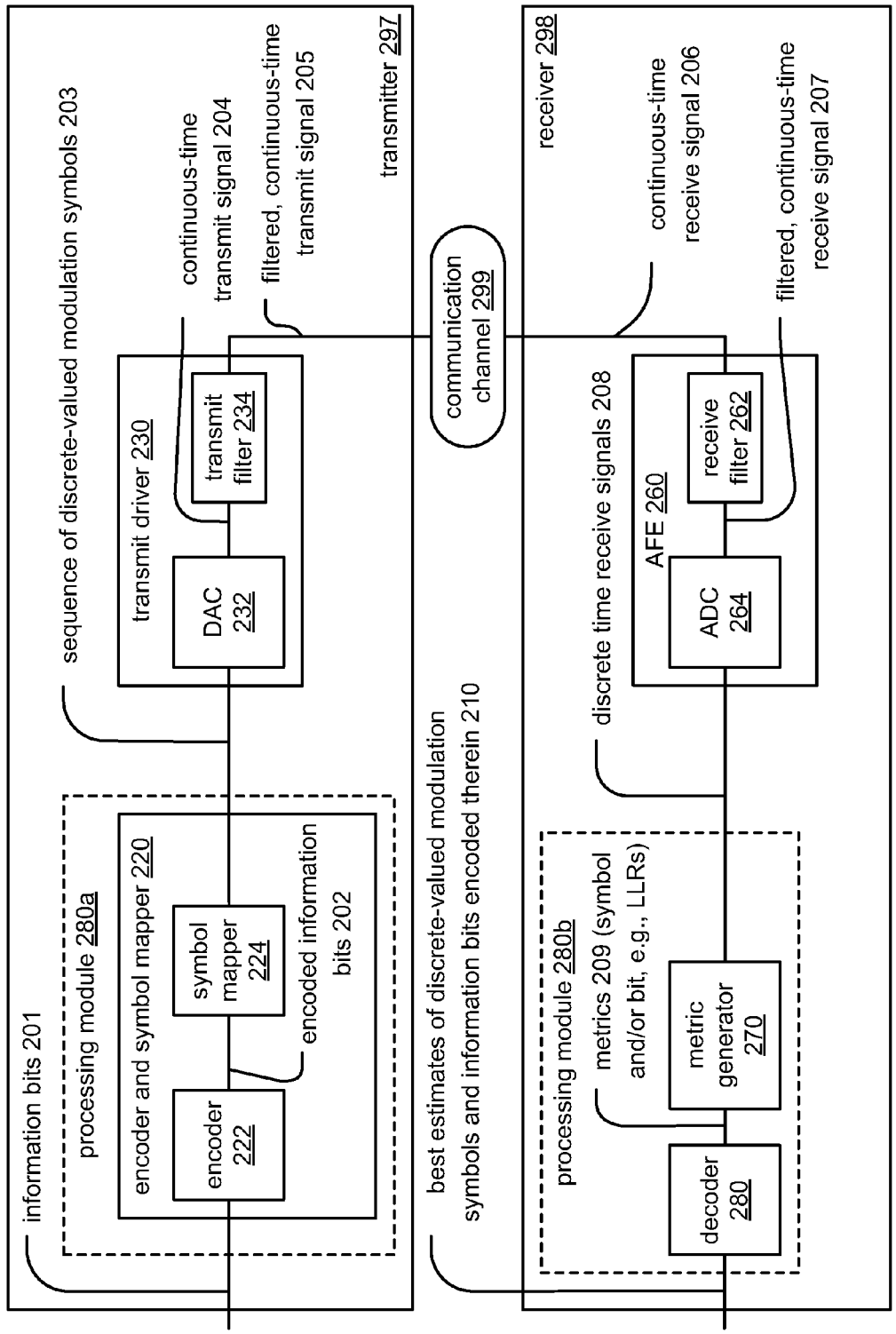

Referring to the communication system 200 of FIG. 2, at a transmitting end of a communication channel 299, information bits 201 (e.g., corresponding particularly to data in one embodiment) are provided to a transmitter 297 that is operable to perform encoding of these information bits 201 using an encoder and symbol mapper 220 (which may be viewed as being distinct functional blocks encoder 222 and symbol mapper 224, respectively, where encoder 222 generates encoded information bits as shown in the diagram) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280b is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of data is communicated from one location, or subsystem, to another (e.g., from transmitter 297 to the receiver 298 via the communication channel 299).

Figure 3:
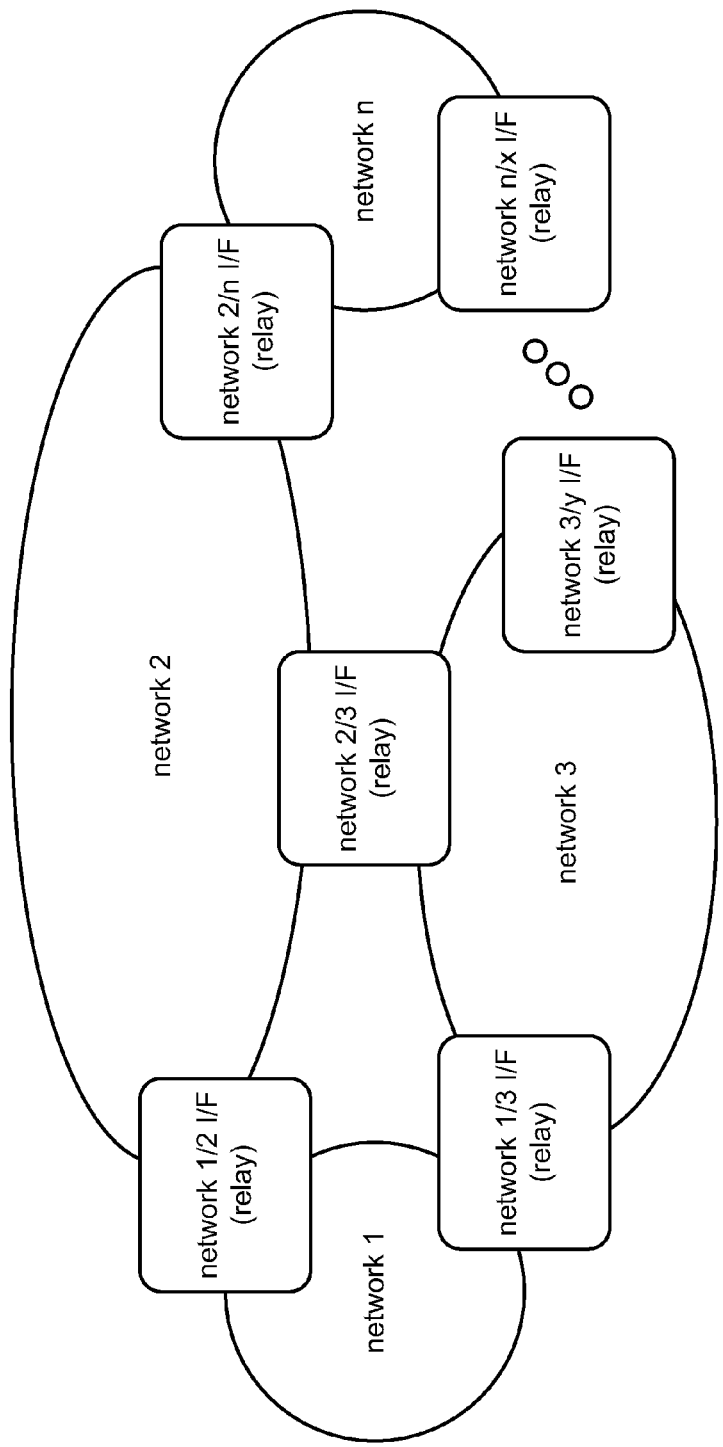

Referring to the embodiment 300 of FIG. 3, such a communication system may generally be viewed as including multiple networks that can interface with each other. Generally speaking, such an embodiment 300 can include a network 1, a network 2, a network 3, and so on up to a network n (e.g., where n is an integer). Such an overall communication system, composed of multiple networks, can generally be referred to as a convergent network (e.g., in which multiple networks are converged with one another thereby generating or forming a larger communication system, namely, a convergent network).

To interface communications between the respective networks, certain interfaces (e.g., relays) may be implemented within certain communication devices that are operative to communication with at least two of the types of network. In some embodiments, a given communication device may include functionality to interface with more than two networks (e.g., 3 networks, 4, networks, etc.). As may be seen in the diagram, an interface by which communications are made between two of the networks is via a network interface (or relay). As some specific examples, communications made between network 1 and network 2 are made via network ½ interface (or relay); communications made between network 1 and network 3 are made via network ⅓ interface (or relay); communications made between network n and network x are made via network n/x interface (or relay); and so on.

Generally speaking, for a communication device to support communications with more than one network will typically result in greater functionality and/or complexity of such a communication device. In some embodiments, a given communication device includes functionality to interface with and support communications with, at most, two of the networks within the overall communication system or convergent network.

Of course, some of the communication devices therein only include functionality to interface with and support communications with one of the networks within the overall communication system or convergent network. When such a communication device (e.g., one including functionality to interface with and support communications with one of the networks) communicates with another communication device including functionality to interface with and support communications with another one of the networks, such communications are made via at least one interface (or relay) by which communications are made from one network to another.

The types of networks that the networks 1 to n may represent may be varied. For examples, such networks may be wired networks, wireless network, optical networks, cellular networks, satellite networks, power line based networks, etc. Of course, certain of these networks may not only operate in accordance with different types of media (e.g., wired, wireless [air], optical, etc.), but certain of these networks may operate in accordance with different communication standards, protocols, and/or recommended practices.

Figure 4:
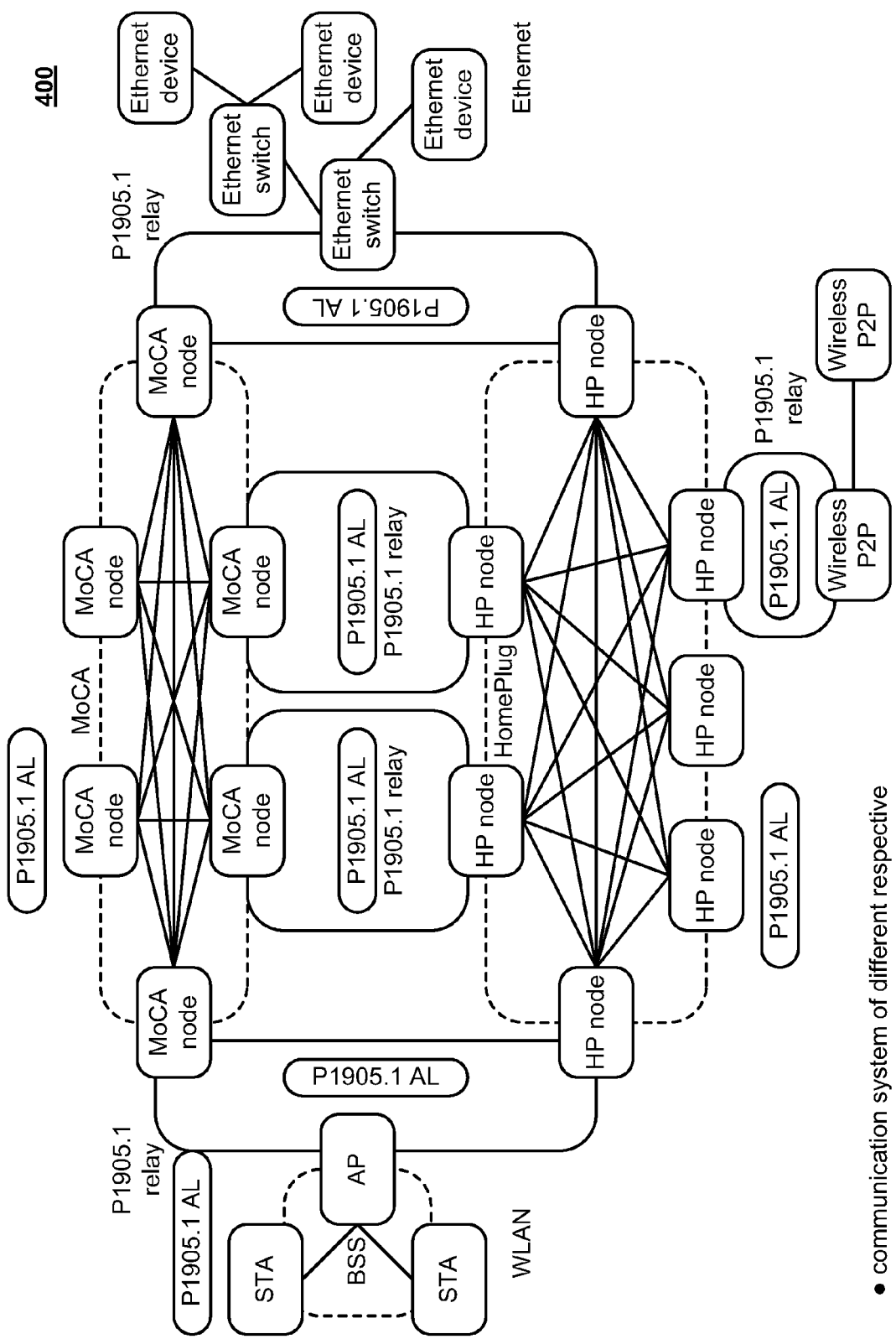

Referring to the embodiment 400 of FIG. 4, such a communication system is a convergent network including interfacing and supporting of communications between various types of communication networks. This diagram particularly depicts a wireless local area network (WLAN/Wi-Fi), a multimedia over coax alliance (MoCA®, or generally referred to as MoCA) network, a local area network (LAN) such as one that operates in accordance with Ethernet or in accordance with IEEE 802.3, a HomePlug® network (e.g., a communication network operating in accordance with various power line communication standards, protocols, and/or recommended practices and can operate using power system related hardware and infrastructure, and may generally be referred to as a PLC type of network), and/or a wireless point to point (P2P) system (shown as Wireless P2P in the diagram).

Various communication devices are operative to support communications with more than one of these various network types within the overall communication system or convergent network. Such communication devices may generally be referred to as relays that perform the appropriate conversion, transcoding, interfacing, etc. of signals received from and compliant with a first type of network in accordance with generating signals compliant with a second type of network; such a relay then forwards the newly generated signal via the second type of network. It is also noted that such relay functionality may be included within any desired communication device within the convergent network. While certain relays may be dedicated relays within the convergent network, any such type of communication device within the convergent network may include such relaying or interfacing functionality therein.

Of course, certain communications may be transmitted across multiple network interfaces and, as such, may undergo appropriate processing in accordance with more than one relay (e.g., from a first type of network to a second type of network, then from the second type of network to a third second type of network, etc.).

In certain communication devices that include such relaying or interfacing functionality therein, a P1905.1 abstraction layer may be implemented above the respective media access control (MAC) layers corresponding to two or more network types. For example, a P1905.1 abstraction layer may be implemented above a first MAC layer corresponding to a WLAN and also above a second MAC layer corresponding to a MoCA network. Alternatively, a P1905.1 abstraction layer may be implemented above a first MAC layer corresponding to a LAN or Ethernet network and also above a second MAC layer corresponding to a HomePlug network. Generally, for a relay device, such a P1905.1 abstraction layer may be implemented above at least two MAC layers corresponding respectively to at least two types of networks within the convergent network. Of course, for a terminal device (e.g., one not implemented to effectuate relaying of frames between two or more interfaces), such a P1905.1 abstraction layer may be implemented over a single MAC layer corresponding to one of the types of networks within the convergent network. In some embodiments, such a terminal device may also be implemented using a P1905.1 abstraction layer to allow the device to be seen as a P1905.1 device and to be controlled by the P1905.1 network management entity in accordance with a P1905.1 control protocol (e.g., so that the device will not be seen as a legacy device in the convergent network).

Figure 5:
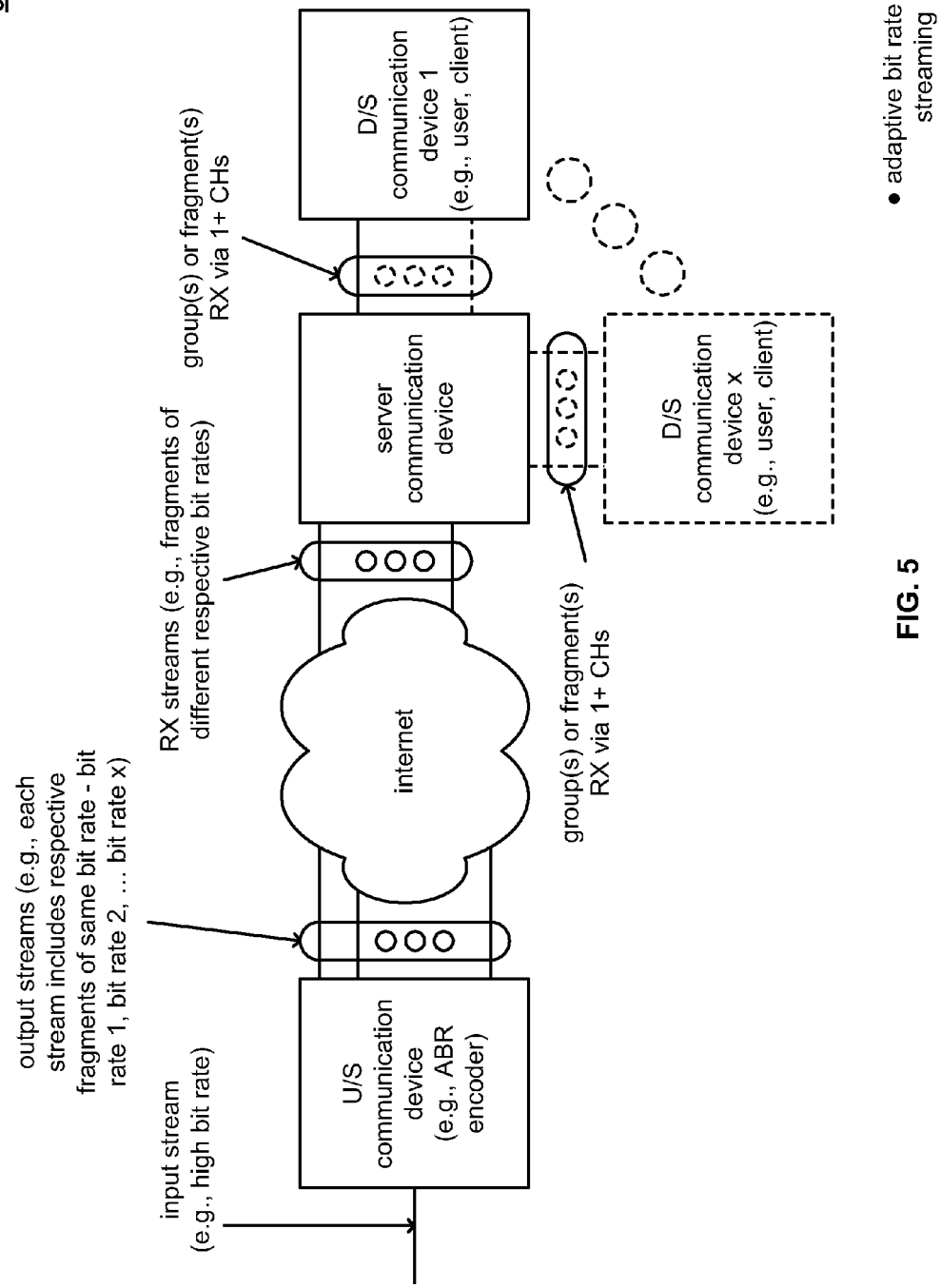
FIG. 5 illustrates an embodiment of adaptive bit rate (ABR) streaming.

FIG. 5 illustrates an embodiment 500 of adaptive bit rate (ABR) streaming. ABR streaming is a technique used in streaming multimedia over communication networks, e.g. Internet. While in the past most video streaming technologies utilized streaming protocols such real time transport protocol (RTP) with real time streaming protocol (RTSP), ABR streaming technologies are almost exclusively based on hypertext transfer protocol (HTTP) and designed to work efficiently over large distributed HTTP networks such as the Internet.

ABR streaming works by detecting a user's bandwidth and central processing unit (CPU) capacity in real time and adjusting the quality of a video stream accordingly. It requires the use of an encoder which can encode a single source video at multiple bit rates. The player client switches between streaming the different encodings depending on available resources. In general, this results very little buffering, fast start time and a good experience for both high-end and low-end connections.

As may be understood, ABR streaming is a means of performing video streaming (or streaming of other types of signals including audio, data, and/or any desired type of signal) over HTTP where the source content is encoded at multiple bit rates, then each of the different bit rate streams are segmented into small multi-second parts. The streaming client is made aware of the available streams at differing bit rates, and segments were fragments of the streams by a manifest file. When starting the client requests the segments from the lowest bit rate stream. If the client finds the download speed is greater than the bit rate of the segment downloaded, then it will request the next higher bit rate segments. Later, if the client finds the download speed for a segment is lower than the bit rate for the segment, and therefore the network throughput has deteriorated, then it will request a lower bit rate segment. The segment size can vary depending on the particular implementation, but they are typically between two and ten seconds in certain embodiments.

Among other benefits that may be provided in accordance with ABR streaming, consumers of streaming media may be provided an experience of the highest quality material when ABR streaming is used because the user's network and playback conditions are automatically adapted to at any given time under changing conditions.

From certain perspectives, the media and entertainment industry are the main beneficiaries of ABR streaming. As the video space grows exponentially, content delivery networks and video providers can provide customers with a superior viewing experience. For multi-user streaming, ABR technology may require less encoding which simplifies overall workflow and creates better results.

In some embodiments, a content delivery network (CDN) may be used to deliver media streaming to an Internet audience, as it allows scalability. The CDN receives the stream from the source at its origin server, then replicates it to many or all of its edge cache servers. The end-user requests the stream and is redirected to the "closest" edge server. The use of HTTP-based adaptive streaming allows the edge server to run a simple HTTP server software, whose license cost is cheap or free, reducing software licensing cost, compared to costly media server licenses (e.g. Adobe Flash Media Streaming Server). The CDN cost for HTTP streaming media is then similar to HTTP web caching CDN cost.

Some of HTTP ABR streaming is based on HTTP progressive download, but contrary to the previous approach, here the files are very small, so that they can be compared to the streaming of packets, much like the case of using RTSP and RTP.

As may be seen within this diagram, and upstream communication device may be implemented to receive an input stream. In certain situations, such an input stream may be a relatively high bit rate stream, and the upstream communication device may include an ABR encoder therein. The upstream communication device may be implemented to generate one or more of a number of output streams, such that each respective stream includes respective fragments of the same bit rate. That is to say, a first stream may include a number of respective fragments each having the same bit rate (e.g., a first output stream including a first number of fragments each having a bit rate 1, a second output stream having a number of fragments each having a bit rate 2, and so on).

Such output streams may be provided via any desired communication system and/or network. In some embodiments, the preferred communication system includes one or more respective Internet pathways. Located in the downstream path may be a server communication device that receives one or more respective received streams. Each respective received stream may compose respective fragments of different respective bit rates. That is say, while the output streams provided from the upstream communication device may each respectively include fragments of the same bit rate, a given receiver communication device located downstream from the upstream communication device may receive different respective streams that have fragments of different respective bit rates. That is to say, a first received stream may include fragments of bit rate 1, bit rate 2, and/or other respective bit rates therein. Analogously, if second received stream may also include fragments of different respective bit rates therein. Located downstream from the server communication device may be one or more downstream communication devices. Such downstream communication devices may generally be referred to as client devices, user devices, user equipment, and/or any other such reference to describe a downstream located communication device that may receive signaling corresponding to the input stream originally received by the upstream communication device.

At each respective downstream communication device (e.g., user, client, etc.), one or more groups or fragments is received via one or more respective channels allowing communication from the server communication device. That is to say, one or more respective channels may be employed to effectuate communication of one or more groups or fragments of the received one or more streams at the server communication device. In addition, it is noted that such configuration of the communication between the server communication device and one or more other respective downstream communication devices may be adaptive. That is to say, the particular configuration by which communication is made between these respective devices may be modified over time based upon any of a number of considerations. For example, the particular groups or fragments of the one or more received streams received by the server communication device that get provided to a given downstream communication device may be different at different respective times. In addition, the channelization by which such information is provided from the server communication device to the one or more downstream communication devices may be modified and changed over time. Any of a number of considerations may be employed to direct the configuration and management of the communication between the server communication device and the other respective downstream communication devices (e.g., including local operating conditions of any one or more of the respective communication devices including the server communication device, the configuration of a network by which communication may be made between the server communication device and the respective downstream communication devices, etc.).

In some embodiments, such a network by which communication is effectuated between the server communication device and the respective downstream communication devices may be a convergent network or a convergent digital home network (CDHN). As may be understood, different respective communication links may be effectuated between such communication devices. In some situations, the server communication device may be viewed as being a home gateway within such a convergent network or a CDHN. Such a convergent digital home network (CDHN) may be implemented such that it is compliant in accordance with IEEE P1905.1. In addition, such a processor within a given communication device (e.g., the server communication device in one particular embodiment) may be operative to assess and monitor at least one characteristic corresponding to the plurality of output channels using a discovery and topology mapping protocol based on IEEE P1905.1. That is to say, any one or more tools based on IEEE P1905.1 may be employed to assist in the management and coordination of communications to be effectuated between the server communication device can the respective downstream one or more communication devices.

Moreover, it is noted that while much of the communication described herein is directed towards and upstream communication device providing one or more signals to one or more downstream communication devices, it is noted that bidirectional communications may be effectuated within the overall system or within or via any given one or more communication links within the overall system. That is say, a downstream communication device may communicate certain information upstream to the server communication device, and such a server communication device may communicate information upstream to the upstream communication device including the ABR encoder, and so on. Again, while the direction by which signaling is typically provided may be viewed as from upstream to the downstream, it is noted that various reverse path or back channel related signaling (e.g., control information, among other types of information that may be provided upstream) may be communicated within any desired communication link or pathway within the overall system.

Figure 6:
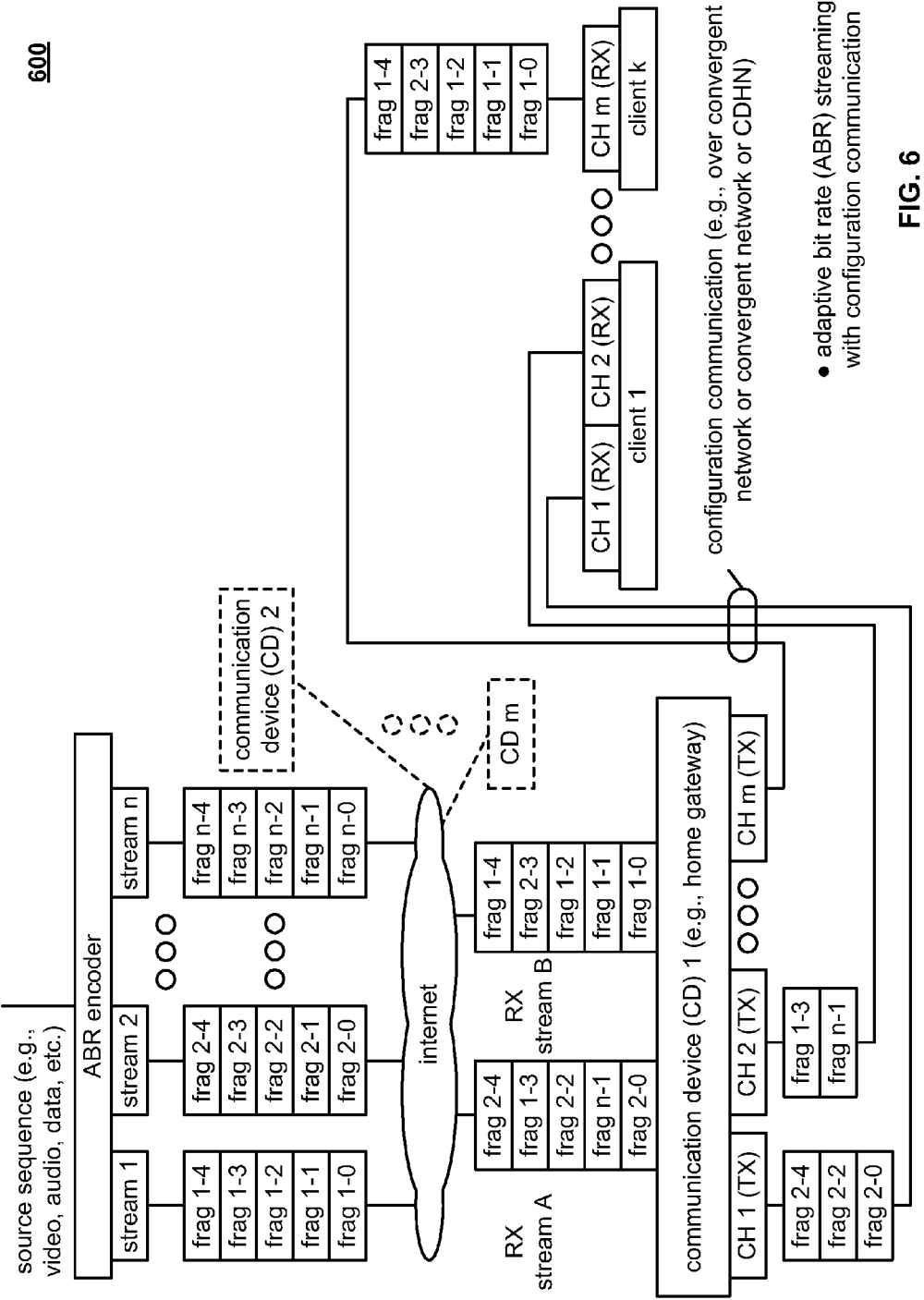
FIG. 6 illustrates an embodiment of adaptive bit rate (ABR) streaming with configuration communication.

FIG. 6 illustrates an embodiment 600 of adaptive bit rate (ABR) streaming with configuration communication. As may be seen within this diagram, an ABR encoder may be implemented to receive the source sequence composed of any one or more types of information including video, audio, data, and/or any other desired type of information. The ABR encoder is operative to generate a number of respective streams each having a respective bit rate. As depicted within the diagram, a first stream includes a first number of fragments each having a first frequency or bit rate. A second stream includes a second number of fragments each having a second frequency or bit rate, and so on. These respective fragments may be provided via a given communication link or network (e.g., the Internet) to another communication device, such as a home gateway. In some embodiments, it is noted that a singular source content is employed, e.g., such that all streams 1-n are generated from the same content (e.g., the same media, same movie, same audio content, etc.). For example, in one embodiment, the streams 1 through n may all be from the same content yet each having different respective encoding rates (e.g., all clients are subscribed to this content).

Alternatively, it is noted that, in other embodiments, more than one content may be employed without departing from the scope and spirit of the invention. Also, it is noted that many different types of channels, networks, etc. may be included within such a convergent network or CDHN (e.g., PLC, Wi-Fi, MoCA, etc., and/or any combination thereof). For example, in one possible implementation, client 1 operates using two respective channels (e.g., PLC and Wi-Fi), and client 2 operates using two respective channels (e.g., MoCA). Of course, as may be understood, variations and changes of which particular channels, networks, etc. may be adapted and changed over time.

However, it is noted that the respective one or more received streams that may be received by the communication device (CD) 1 (e.g., home gateway) may not be exactly any one the singular of the streams generated by the ABR encoder, but rather a combination of individual fragments from two or more respective streams generated by the ABR encoder. In some instances, it is noted that a given received stream may in fact be an exact stream generated by the ABR encoder, but given variability within the communication network or Internet, in most instances, a given received stream will include fragments of two or more respective streams output from the ABR encoder. Generally, all (time-synchronized) streams 1-n are selectable by any one of the clients 1-k. For example, with respect to this diagram, clients 1 through k operate by requesting a source sequence (e.g., a [which may be live] streaming video, audio, data, etc. sequence) from an ABR encoder service. The requests from Clients 1 and k are sent to CD 1 or home gateway. Then, the CD 1 or home gateway operates to regenerate 2 relay requests based on the its knowledge on networks and platforms capabilities (e.g., such as determined in accordance with a discovery and topology mapping protocol based on IEEE P1905.1) resulting in the two received streams RX stream A and RX stream B which are intended to be sent to Clients 1 and k, respectively. Also, client 1 may operate using a bonded channel (e.g., two or more channels operating cooperatively, CH1 and CH2). Therefore, the CD 1 or home gateway splits the fragments of RX stream A and sends them (e.g., using fragment boundary stream distribution for channel bonding in the convergent network or CDHN). As may be seen in this diagram, RX stream B is passed through the convergent network or CDHN and sent to client k without changes.

It is noted that any of a number of respective communication devices may also be implemented to receive one or more received streams via the communication network or Internet that are respectively composed of combinations of fragments within each of the respective streams generated by the ABR encoder.

The CD 1 or home gateway then includes capability to effectuate communication or interfacing via one or more respective channels to one or more respective client devices. The particular connectivity between the CD 1 or home gateway and the one or more client devices may be a convergent network or CDHN. As mentioned elsewhere herein with respect other embodiments, such a CDHN may be implemented such that it is compliant in accordance with IEEE P1905.1. In addition, such a processor within a given communication device (e.g., the CD1 or home gateway in one particular embodiment) may be operative to assess and monitor at least one characteristic corresponding to the plurality of output channels using a discovery and topology mapping protocol based on IEEE P1905.1. That is to say, any one or more tools based on IEEE P1905.1 may be employed to assist in the management and coordination of communications to be effectuated between the CD 1 or home gateway and the one or more client devices. That is to say, it is noted that when such a convergent network or CDHN is employed to effectuate the conductivity between the CD 1 or home gateway and the one or more client devices, any one or more of respective tools operative in accordance with such convergent network or CDHN communication protocols may be employed to assist in the management and coordination of the network.

As may be understood, the various communication devices (e.g., CD 1 or home gateway and the one or more client devices) may include respective communication interfaces to effectuate communication there between. The respective manner by which the network connecting these respective communication devices may be understood by at least one of the respective devices in terms of network, bandwidth, operating conditions, local operating conditions, remote operating conditions, and/or any other respective considerations pertaining to the operation of such a network such as a convergent network or CDHN. In a preferred embodiment, a home gateway implemented communication device may serve as the device to effectuate such coordination and management of the communication over the network.

As may be seen with respect to this diagram, communication from the home gateway to the one or more client devices may be effectuated using one or more respective channels (e.g., such as to client 1 in which more than one channel is employed, which may be viewed as a bonded channel such as including two or more channels). Again, as mentioned with respect other embodiments, it is noted that the configuration and manner by which communication is made within such a network may vary adaptively over time.

Generally speaking, such configuration and coordination of communication between the home gateway in the respective client devices may be performed by an application operative on one or more of these respective devices. As mentioned above, in a preferred situation or embodiment, the home gateway may support such an application. For example, the home gateway may request a particular stream from the ABR encoder communication device. Then, based upon any of a number of considerations, tools, parameters, etc., including those based on IEEE P1905.1, the home gateway may employ information corresponding to the convergent network or CDHN to ensure appropriate delivery of a given stream to the one or more client devices. For example, based upon such information corresponding to the convergent network or CDHN, the home gateway may request from a server communication device one or more particular streams having certain characteristics.

The operation of the convergent network or CDHN, as directed by an application running on one or more of the respective communication devices therein (e.g., on the home gateway in one particular embodiment), provides for one or more fragments corresponding to one or more received streams to be provided from the home gateway to one or more of the client devices. Based upon assessment and monitoring of one or more characteristics associated with the convergent network or CDHN, such an application may appropriately request a particular stream from the ABR encoder communication device as well as appropriately provide one or more fragments corresponding to one or more received streams to the one or more client devices. Again, such operation with respect to the configuration of the convergent network or CDHN may be dynamic, in that, the manner by which fragments are provided from the home gateway to one or more of the client devices may vary over time.

Generally speaking, such operation may be viewed as a gateway based in centric network management and coordination to ensure and provide for effective delivery of the sources sequence to one or more client devices. It is also noted that such a home gateway may be implemented as a server communication device itself. In such an implementation of the home gateway, there may not necessarily be a need for ABR. However, within systems providing at least one feature associated with ABR, appropriate coordination and management of the delivery of one or more fragments corresponding to one or more received streams from the home gateway to one or more client devices may be made based upon any of a number of considerations, tools, parameters, etc., including those based on IEEE P1905.1.

As may be understood, having such real-time and accurate information corresponding to the convergent network or CDHN, a given application, such as one supported by one or more of the communication devices within the convergent network or CDHN (e.g., the home gateway), allows for assessing characteristics of the network, dynamic and adaptive modification of the manner by which fragments are provided from the home gateway to the one or more client devices, etc.

As may also be understood, a given client device that receives one or more first fragments via a first channel and one or more second fragments via a second channel should have capability to perform reassembly of those respective fragments if information is received via two or more channels. For example, if such information is received via two or more channels, such a client device should have capability to perform reassembly and do link aggregation. For a given client device not having such reassembly and link aggregation capability, such communication may be configured to ensure that fragments are provided to that particular client device only be a one respective channel at a time.

Figure 6A:
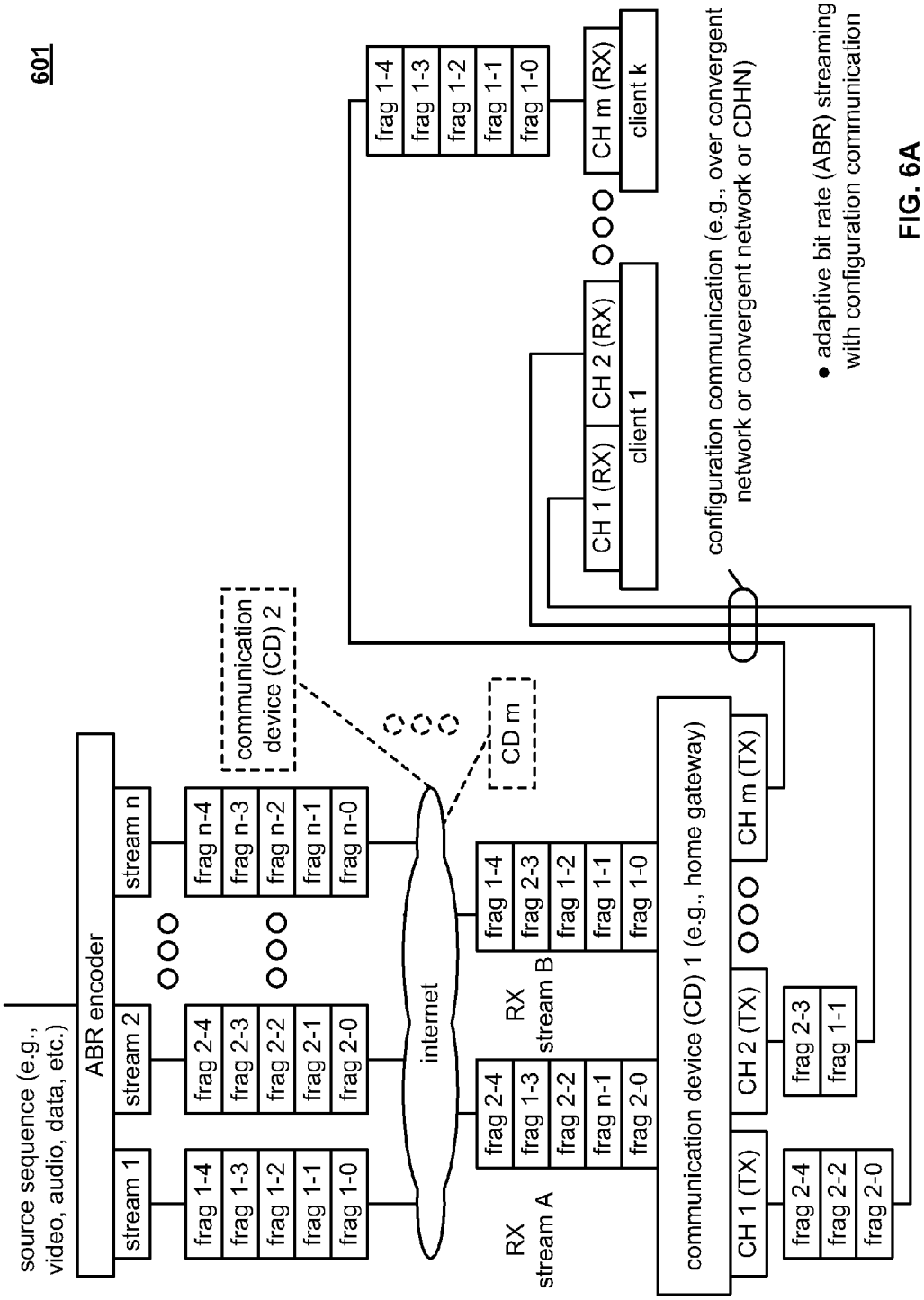
FIG. 6A illustrates an alternative embodiment of ABR streaming with configuration communication.

FIG. 6A illustrates an alternative embodiment 601 of ABR streaming with configuration communication. In some embodiments, the CD 1 or home gateway may be implemented to reassemble the streams for its respective clients (e.g., in comparing FIG. 6, FIG. 6 a illustrate swapping "frag 1-3" and "frag 2-3", or alternatively, duplicating "frag 1-3" in the place of "frag 2-3". As may be understood, such fragment boundary based ABR stream switching may be performed within a CD1 or home gateway in some embodiments.

Figure 8B:
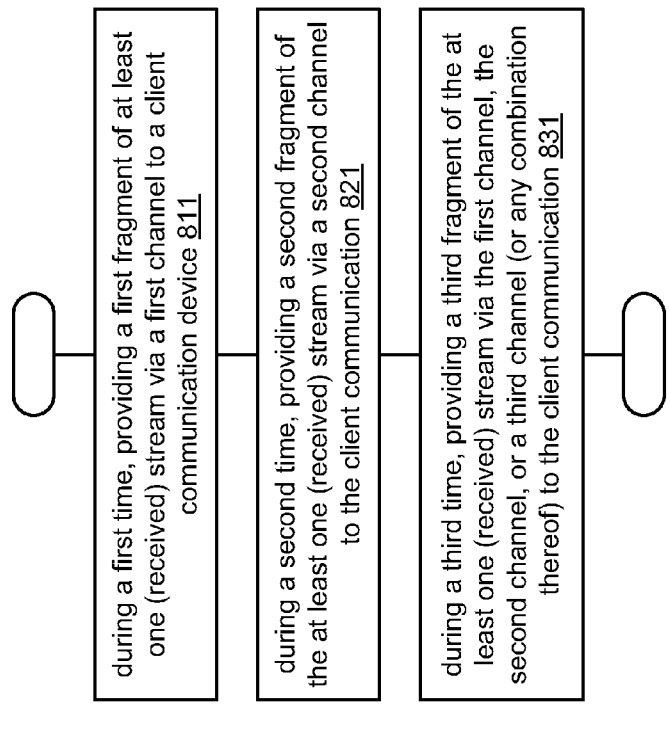
Figure 8A:
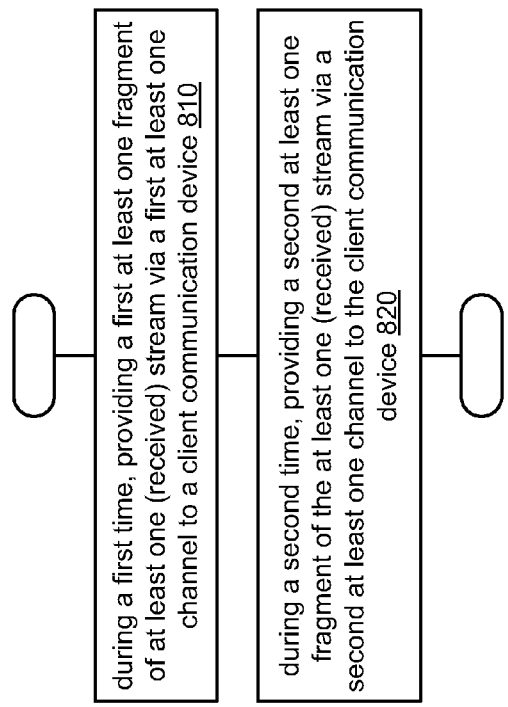

FIG. 7, FIG. 8A, and FIG. 8B illustrate various embodiments 700, 800, and 801, of methods for operating one or more communication devices.

Referring to method 700 of FIG. 7, the method 700 begins by operating a first at least one communication interface of the gateway communication device to receive, via at least one input channel, at least one signal stream including a plurality of fragments, as shown in a block 710.

The method 700 continues by operating a second at least one communication interface of the gateway communication device to output, via a plurality of output channels, the plurality of fragments to at least one of a plurality of destination devices for output thereby, as shown in a block 720.

The method 700 then operates by assessing and monitoring at least one characteristic corresponding to the at least one input channel, the plurality of output channels, and the plurality of destination devices, as shown in a block 730.

The method 700 continues by based on the assessed and monitored at least one characteristic, adaptively providing at least some of the plurality of fragments, via a selected at least one of the plurality of output channels, to the at least one of a plurality of destination devices for output thereby, as shown in a block 740.

Referring to method 800 of FIG. 8A, the method 800 begins, during a first time, by providing a first at least one fragment of at least one (received) stream via a first at least one channel to a client communication device, as shown in a block 810.

The method 800 continues, during a second time, by providing a second at least one fragment of the at least one (received) stream via a second at least one channel to the client communication device, as shown in a block 820.

Referring to method 801 of FIG. 8B, the method 801 begins, during a first time, by providing a first fragment of at least one (received) stream via a first channel to a client communication device, as shown in a block 811.

The method 801 then operates, during a second time, by providing a second fragment of the at least one (received) stream via a second channel to the client communication, as shown in a block 821.

The method 801 continues, during a third time, by providing a third fragment of the at least one (received) stream via the first channel, the second channel, or a third channel (or any combination thereof) to the client communication, as shown in a block 831.

It is also noted that the various operations and functions as described with respect to various methods herein may be performed within a variety of types of communication devices, such as using one or more processors, processing modules, etc. implemented therein, and/or other components therein including one of more baseband processing modules, one or more media access control (MAC) layers, one or more physical layers (PHYs), and/or other components, etc.

In some embodiments, such a processor, circuitry, and/or a processing module, etc. (which may be implemented in the same device or separate devices) can perform such processing to generate signals for communication with other communication devices in accordance with various aspects of the invention, and/or any other operations and functions as described herein, etc. or their respective equivalents. In some embodiments, such processing is performed cooperatively by a first processor, circuitry, and/or a processing module, etc. in a first device, and a second first processor, circuitry, and/or a processing module, etc. within a second device. In other embodiments, such processing is performed wholly by a processor, circuitry, and/or a processing module, etc. within a singular communication device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A communication device comprising:
   a communication interface; and
   a processor, at least one of the processor or the communication interface configured to:
   select a combination of fragments from a plurality of fragments based on at least one characteristic of a communication channel between the communication device and another communication device that is located remotely from the communication device, wherein the plurality of fragments correspond to a plurality of segments of a signal stream based on a plurality of bit rates;
   process the combination of fragments to generate an output signal that is representative of the signal stream; and
   transmit the output signal to the another communication device that is located remotely from the communication device via the communication channel.

2. The communication device of claim 1, wherein the another communication device is a first other communication device, and wherein the at least one of the processor or the communication interface is further configured to:
   select another combination of fragments from the plurality of fragments based on at least one characteristic of another communication channel between the communication device and a second other communication device;
   process the another combination of fragments to generate another output signal that is representative of the signal stream; and
   transmit the another output signal to the second other communication device via the another communication channel.

3. The communication device of claim 1, wherein the at least one of the processor or the communication interface is further configured to:
   select another combination of fragments from the plurality of fragments based on a change of the at least one characteristic of the communication channel between the communication device and the another communication device;
   process the another combination of fragments to generate another output signal that is representative of the signal stream; and
   transmit the another output signal to the another communication device via the communication channel.

4. The communication device of claim 1, wherein:
   a first fragment subset of the plurality of fragments is based on a first bit rate of the plurality of bit rates and is representative of the signal stream at a first quality associated with the first bit rate;
   a second fragment subset of the plurality of fragments is based on a second bit rate of the plurality of bit rates and is representative of the signal stream at a second quality associated with the second bit rate; and
   at least two different fragments of the plurality of fragments that are based on different bit rates of the plurality of bit rates, respectively, correspond to a common segment of the plurality of segments of the signal stream.

5. The communication device of claim 1, wherein:
   the combination of fragments includes a first fragment of the plurality of fragments that is based on a first bit rate of the plurality of bit rates and a second fragment of the plurality of fragments that is based on a second bit rate of the plurality of bit rates; and
   the combination of fragments is representative of the signal stream at a quality associated with a combination of the first bit rate and the second bit rate.

6. The communication device of claim 1, wherein the at least one characteristic of the communication channel includes at least one of a network that includes the communication channel, a bandwidth of the communication channel, a local operating condition of the communication device, or a remote operating condition of the another communication device.

7. The communication device of claim 1, wherein the another communication device is a first other communication device, and further comprising:
   a gateway communication device that is configured to receive the plurality of fragments from a second other communication device that includes an adaptive bit rate (ABR) encoder via an Internet communication pathway.

8. The communication device of claim 1, wherein the at least one of the processor or the communication interface is further configured to:
   support communications within at least one of a satellite communication system, a wireless communication system, a wired communication system, a fiber-optic communication system, or a mobile communication system.

9. A communication device comprising:
   a communication interface; and
   a processor, at least one of the processor or the communication interface configured to:
   receive a plurality of fragments from a first other communication device that includes an adaptive bit rate (ABR) encoder via an Internet communication pathway, wherein the plurality of fragments correspond to a plurality of segments of a signal stream based on a plurality of bit rates;

select a first combination of fragments from the plurality of fragments based on at least one characteristic of a communication channel between the communication device and a second other communication device that is located remotely from the communication device;

process the combination of fragments to generate a first portion of an output signal that is representative of the signal stream;

transmit the first portion of the output signal to the second other communication device that is located remotely from the communication device via the communication channel;

select a second combination of fragments from the plurality of fragments based on a change of the at least one characteristic of the communication channel between the communication device and the second other communication device that is located remotely from the communication device;

process the second combination of fragments to generate a second portion of the output signal that is representative of the signal stream; and transmit the second portion of the output signal to the second other communication device that is located remotely from the communication device via the communication channel.

10. The communication device of claim 9, wherein the at least one of the processor or the communication interface is further configured to:

select another combination of fragments from the plurality of fragments based on at least one characteristic of another communication channel between the communication device and the second other communication device;

process the another combination of fragments to generate another output signal that is representative of the signal stream; and transmit the another output signal to the second other communication device via the another communication channel.

11. The communication device of claim 9, wherein:

a first fragment subset of the plurality of fragments is based on a first bit rate of the plurality of bit rates and is representative of the signal stream at a first quality associated with the first bit rate;

a second fragment subset of the plurality of fragments is based on a second bit rate of the plurality of bit rates and is representative of the signal stream at a second quality associated with the second bit rate; and at least two different fragments of the plurality of fragments that are based on different bit rates of the plurality of bit rates, respectively, correspond to a common segment of the plurality of segments of the signal stream.

12. The communication device of claim 9, wherein the at least one characteristic of the communication channel includes at least one of a network that includes the communication channel, a bandwidth of the communication channel, a local operating condition of the communication device, or a remote operating condition of the second other communication device.

13. The communication device of claim 9, wherein the at least one of the processor or the communication interface is further configured to:

support communications within at least one of a satellite communication system, a wireless communication system, a wired communication system, a fiber-optic communication system, or a mobile communication system.

14. A method for execution by a communication device, the method comprising:

selecting a combination of fragments from a plurality of fragments based on at least one characteristic of a communication channel between the communication device and another communication device that is located remotely from the communication device, wherein the plurality of fragments correspond to a plurality of segments of a signal stream based on a plurality of bit rates;

processing the combination of fragments to generate an output signal that is representative of the signal stream; and transmitting, via a communication interface of the communication device, the output signal to the another communication device that is located remotely from the communication device via the communication channel.

15. The method of claim 14, wherein the another communication device is a first other communication device, and further comprising:

selecting another combination of fragments from the plurality of fragments based on at least one characteristic of another communication channel between the communication device and a second other communication device;

processing the another combination of fragments to generate another output signal that is representative of the signal stream; and transmitting, via the communication interface of the communication device, the another output signal to the second other communication device via the another communication channel.

16. The method of claim 14 further comprising:

selecting another combination of fragments from the plurality of fragments based on a change of the at least one characteristic of the communication channel between the communication device and the another communication device;

processing the another combination of fragments to generate another output signal that is representative of the signal stream; and transmitting, via the communication interface of the communication device, the another output signal to the another communication device via the communication channel.

17. The method of claim 14, wherein:

a first fragment subset of the plurality of fragments is based on a first bit rate of the plurality of bit rates and is representative of the signal stream at a first quality associated with the first bit rate;

a second fragment subset of the plurality of fragments is based on a second bit rate of the plurality of bit rates and is representative of the signal stream at a second quality associated with the second bit rate; and at least two different fragments of the plurality of fragments that are based on different bit rates of the plurality of bit rates, respectively, correspond to a common segment of the plurality of segments of the signal stream.

18. The method of claim 14, wherein:

the combination of fragments includes a first fragment of the plurality of fragments that is based on a first bit rate of the plurality of bit rates and a second fragment of the plurality of fragments that is based on a second bit rate of the plurality of bit rates; and the combination of fragments is representative of the signal stream at a quality associated with a combination of the first bit rate and the second bit rate.

19. The method of claim 14, wherein the at least one characteristic of the communication channel includes at least one of a network that includes the communication channel, a bandwidth of the communication channel, a local operating condition of the communication device, or a remote operating condition of the another communication device.

20. The method of claim 14 further comprising:

operating the communication interface of the communication device to support communications within at least one of a satellite communication system, a wireless communication system, a wired communication system, a fiber-optic communication system, or a mobile communication system.

* * * * *